United States Patent
Meehan

(10) Patent No.: US 8,994,645 B1
(45) Date of Patent: Mar. 31, 2015

(54) SYSTEM AND METHOD FOR PROVIDING A VIRTUAL OBJECT BASED ON PHYSICAL LOCATION AND TAGGING

(75) Inventor: Patrick Carson Meehan, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 242 days.

(21) Appl. No.: 12/852,366

(22) Filed: Aug. 6, 2010

Related U.S. Application Data

(60) Provisional application No. 61/232,273, filed on Aug. 7, 2009.

(51) Int. Cl.
*G06F 3/01* (2006.01)
*H04L 12/16* (2006.01)

(52) U.S. Cl.
CPC .................................... *H04L 12/16* (2013.01)
USPC ........................................................ 345/156

(58) Field of Classification Search
CPC ........................................................ G06F 3/11
USPC ....................... 345/156, 633; 700/65; 715/513
See application file for complete search history.

(56) References Cited

U.S. PATENT DOCUMENTS

| | | | |
|---|---|---|---|
| 6,691,032 B1 * | 2/2004 | Irish et al. | 701/487 |
| 6,961,629 B2 * | 11/2005 | Fukui et al. | 700/65 |
| 6,988,010 B2 | 1/2006 | Taniguchi et al. | |
| 7,366,987 B2 | 4/2008 | Taniguchi et al. | |
| 7,453,471 B2 * | 11/2008 | Fukui et al. | 345/633 |
| 7,890,582 B2 | 2/2011 | Im et al. | |
| 2004/0103374 A1 * | 5/2004 | Chishima | 715/513 |
| 2007/0035563 A1 * | 2/2007 | Biocca et al. | 345/633 |
| 2007/0180979 A1 * | 8/2007 | Rosenberg | 84/611 |
| 2008/0150965 A1 | 6/2008 | Bischoff et al. | |
| 2008/0218515 A1 * | 9/2008 | Fukushima et al. | 345/424 |
| 2008/0252527 A1 | 10/2008 | Garcia | |
| 2008/0293488 A1 | 11/2008 | Cheng et al. | |
| 2009/0129630 A1 | 5/2009 | Gloudemans et al. | |
| 2010/0066750 A1 | 3/2010 | Yu et al. | |
| 2010/0185529 A1 | 7/2010 | Chesnut et al. | |
| 2010/0287511 A1 | 11/2010 | Meier et al. | |

FOREIGN PATENT DOCUMENTS

WO    WO 2009040093    4/2009

OTHER PUBLICATIONS

Jonsson et al., "The Art of Game-Mastering Pervasive Games," Computer Entertainment Technology, vol. 352 of ACM International Conference Proceeding Series, p. 224-231. ACM, (2008).
Thomas et al., "First Person Indoor/Outdoor Augmented Reality Application: ARQuake," Feb. 2002, Springer-Verlag, Personal and Ubiquitous Computing, vol. 6; pp. 75-86.

* cited by examiner

*Primary Examiner* — Ariel Balaoing
(74) *Attorney, Agent, or Firm* — Patrick J. S. Inouye; Makiko Coffland

(57) ABSTRACT

A computer-implemented system and method for providing a virtual object based on physical location and tagging are provided. A set of virtual objects are maintained in a database on a mobile computing device. Each virtual object includes an action associated with an identifier and coordinates for one or more physical locations. A physical location of the mobile computing device is tracked and an identification tag within range of the mobile computing device is identified. The mobile computing device's physical location and the identification tag are respectively evaluated against the coordinates and the identifiers for the virtual objects in the database. For each of the coordinates and identifiers matched to the physical location and the identification tag, the action associated with the correspondingly matched virtual object is performed using the mobile computing device.

19 Claims, 2 Drawing Sheets

| Action | ID | Location |
|---|---|---|
| -present virtual object of a ghost with a clue | 1423 | 47°37'13.98"N 122°20'58.11"W |
| -present a riddle | 1423 | |
| -present a virtual object providing informational data | 1424 | 38.89767° N 77.03655° W |

SYSTEM AND METHOD FOR PROVIDING A VIRTUAL OBJECT BASED ON PHYSICAL LOCATION AND TAGGING

CROSS-REFERENCE TO RELATED APPLICATION

This non-provisional patent application claims priority under 35 U.S.C. §119(e) to U.S. Provisional Patent application Ser. No. 61/232,273, filed Aug. 7, 2009, the priority filing date of which is claimed, and the disclosure of which is incorporated by reference.

FIELD

The invention relates in general to augmented reality provisioning and, specifically, to a system and method for providing a virtual object based on physical location and tagging.

BACKGROUND

An augmented reality combines real world attributes, such as physical position or movement, with computer-generated, often graphical, data. Together, the attributes and data form a user experience occurring in a virtualized space as influenced by real world inputs, typically co-occurring in real time. In general, augmented realities are presented through graphical user interfaces, which can also be supplemented with auditory cues, tactile feedback, and other computer outputs. Thus, the user is immersed into a virtual reality by feeding sensory data through the computer-generated data that changes in response to user actions.

Recently, the capabilities of mobile platforms, such as portable media players, personal data assistants (PDA), and mobile telephones, have grown to enable on-the-go generation of augmented realities. Users are no longer tied to desktop environments and the physical constraints imposed by having to remain in a relatively stationary position. Moreover, these platforms are increasingly being equipped with input capabilities extending beyond the immediate user interface. For instance, mobile telephones often incorporate built-in cameras and global positioning system (GPS) receivers, the latter of which enables the device to determine the user's physical location. Similarly, portable media players are beginning to incorporate motion sensors that sense directional device orientation.

For the most part, the extended capabilities of these devices have been limited to supplementing conventional user interface inputs, such as altering a screen display on a portable media player based on physical vertical or horizontal orientation of the player. Other devices act as remote data input sources. For instance, U.S. Pat. No. 7,453,471 to Fukui et al. discloses a virtual-object management apparatus that associates and stores object information related to the shape and location of a virtual object, such as provided through a GPS receiver, with service information, which are sent to a stationary digital camera. The digital camera causes execution of an action, according to the service information, upon determining that the digital camera is itself disposed within an area defined inside a virtual object based on the object information. However, the service is triggered using location alone, which can be grossly inaccurate, and requires use of a digital camera that serves as a stationary point of reference.

Therefore, a need remains for an approach to combining extended mobile platform input capabilities with virtual reality outputs, which can engage the user in a fully three-dimensional augmented reality experience.

SUMMARY

A system and method for providing a virtual object based on physical location and tagging. A mobile computing platform that is capable of self-position sensing identifies a physical identification tag, which is combined with physical location information. Platform-performable actions, such as displaying of graphical objects, playing of auditory cues, or generating tactile feedback, are stored in an onboard database and each action is associated with a predetermined identification tag and one or more physical locations, such as defined by geolocational data. The identification tag and physical location information are evaluated against the database and, when matching, the corresponding action is performed by the platform.

One embodiment provides a computer-implemented system and method for providing a virtual object based on physical location and tagging. A set of virtual objects are maintained in a database on a mobile computing device. Each virtual object includes an action associated with an identifier and coordinates for one or more physical locations. A physical location of the mobile computing device is tracked and an identification tag within range of the mobile computing device is identified. The mobile computing device's physical location and the identification tag are respectively evaluated against the coordinates and the identifiers for the virtual objects in the database. For each of the coordinates and identifiers matched to the physical location and the identification tag, the action associated with the correspondingly matched virtual object is performed using the mobile computing device.

A further embodiment provides a computer-implemented system and method for providing a virtual object through a network based on physical location and tagging. A set of virtual objects is maintained in a database on a centralized server. Each virtual object includes an action associated with an identifier and coordinates for one or more physical locations. A mobile computing device is interfaced with the centralized server over a data communications network. The virtual objects are provided to the mobile computing device. A physical location of the mobile computing device is tracked and an identification tag within range of the mobile computing device is identified. The mobile computing device's physical location and the identification tag are respectively evaluated against the coordinates and the identifiers for the virtual objects in the database. For each of the coordinates and identifiers matched to the physical location and the identification tag, the action associated with the correspondingly matched virtual object is performed using the mobile computing device.

A still further embodiment provides a computer-implemented system and method for performing an augmented reality scenario. A scenario is defined. An identifier is placed at a plurality of physical locations. At least one action to be performed is specified at each of the physical locations at which one such identifier has been placed. Virtual objects that include each of the actions associated with the identifier and coordinates for the physical location of the action are defined. All of the virtual objects are assembled into a database. The scenario is performed through a mobile computing device. A physical location of the mobile computing device is tracked and an identification tag within range of the mobile computing device is identified. The mobile computing device's physical location and the identification tag are respectively evaluated against the coordinates and the identifiers for the virtual objects in the database. For each of the coordinates and identifiers matched to the physical location and the identification tag, the action associated with the correspondingly matched virtual object is performed using the mobile computing device.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
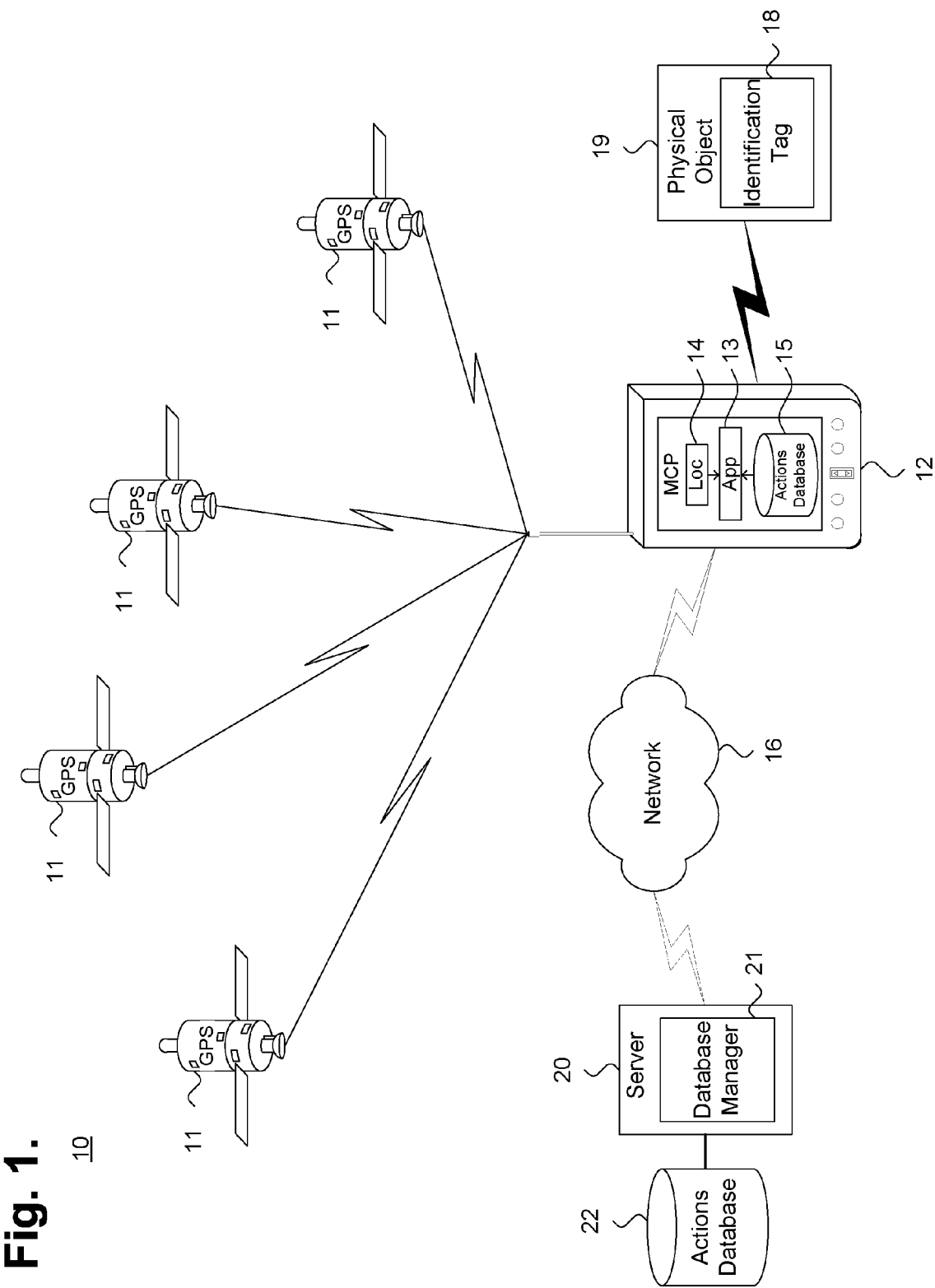
FIG. 1 is a functional block diagram showing a system for providing a virtual object based on physical location and tagging in accordance with one embodiment.

Identification tags and physical location information, both determined locally and on-the-fly by a mobile computing platform, are dynamically combined to trigger performance of an action, which contributes to an augmented reality user experience. FIG. 1 is a functional block diagram showing a system for providing a virtual object based on physical location and tagging in accordance with one embodiment. The system 10 operates in accordance with a sequence of process steps, as further described below with reference to FIG. 3.

Each user operates a mobile computing platform (MCP) 12, such as a portable media player, personal data assistant (PDA), or mobile telephone. Other types of MCPs are possible. The MCP 12 executes an application program ("app") 13, which can be implemented through software, firmware, or hardware for execution locally on the MCP 12. In one embodiment, the application 13 includes a downloadable cartridge written as an executable script that defines triggerable events, such as described in commonly-assigned U.S. Pat. No. 6,691,032 to Irish et al., the disclosure of which is incorporated by reference. Other forms of application programs are possible.

The application 13 receives two input parameters, physical location information ("loc") 14 and an identification tag 18. The physical location information 14 and identification tag 18 are paired and compared to data stored in an onboard actions database 15. The database 15 stores predetermined associations between pairings of physical locations and identification tags and actions that contribute to a three-dimensional augmented reality user experience, as further described below with reference to FIG. 2. If a match between the physical location information 14 and identification tag 18 pairing and one of the predetermined associations in the database is made, the corresponding action is performed by the MCP 12.

The MCP 12 is capable of self-position sensing in generating the physical location information 14 using, for instance, a GPS receiver, or with reference to a stationary data marker. In general, GPS receivers interpret signals received from an orbiting constellation of GPS satellites 11, which transmit locational signals that are triangulated into geolocational data. In one embodiment, the MCP 12 determines location from geolocational data, minimally consisting of latitude and longitude or similar coordinates. The geolocational data can originate from a standalone GPS receiver attached via a conventional cable to the MCP 12 or GPS receiver components incorporated into the MCP 12 itself. A stationary data marker can include a wireless receiver for receiving signals from a stationary GPS beacon, which includes beacons broadcast via cellular telephone, wireless fidelity ("Wi-Fi"), Bluetooth, or other types of wireless communications. In a further embodiment, the MCP 12 receives the physical location information 14 via user input through the MCP's user interface.

The MCP 12 also is capable of identifying an identification tag 18 found on a physical object 19, which can include a movable physical item or stationary place. The identification tag 18 can be embedded, placed upon, or otherwise attached to or associated with the physical object 19. The identification tag 18 can be passive, that is, physically visible, such as a bar code, grid, image tag, or numeric, alphabetic, or symbolic sequence or combination thereof, or active, such as provided through wireless communications, such as a transmitted radio frequency identification (RFID) tag. The MCP 12 includes recognition software or hardware to identify or decode each identification tag 18. Each identification tag 18 can be unique or the same as other identification tags, as the combination of an identification tag 18 and the physical location information 14 will generally be sufficient to distinctively identify the physical object 19. In a further embodiment, the MCP 12 receives the identification tag 18 via user input through the MCP's user interface.

In a still further embodiment, the MCP 12 is also network-capable and can interface with other devices over a network 16, for instance, an internetwork, such as the Internet, or other distributed data communications channel, including open or proprietary wired, wireless, satellite, or other forms of data communication. In addition, the actions database 22 can be provided remotely through a database manager 21 executing on a server 20 accessible via the network 16. The actions database 22 can be either in addition to or in lieu of the actions database 15 maintained locally by each MCP 12.

The individual computer systems, including the server 20, include general purpose, programmed digital computing devices consisting of a central processing unit (CPU), random access memory (RAM), non-volatile secondary storage, such as a hard drive or CD ROM drive, network or wireless interfaces, and peripheral devices, including user interfacing means, such as a keyboard and display. Mobile computing platforms include comparable components adapted to portable use and, where applicable, particularized applications, such as digital media playback or mobile communications. In general, program code, including software programs, and data is loaded into the RAM for execution and processing by the CPU and results are generated for display, output, transmittal, or storage.

Figures 2, 3:
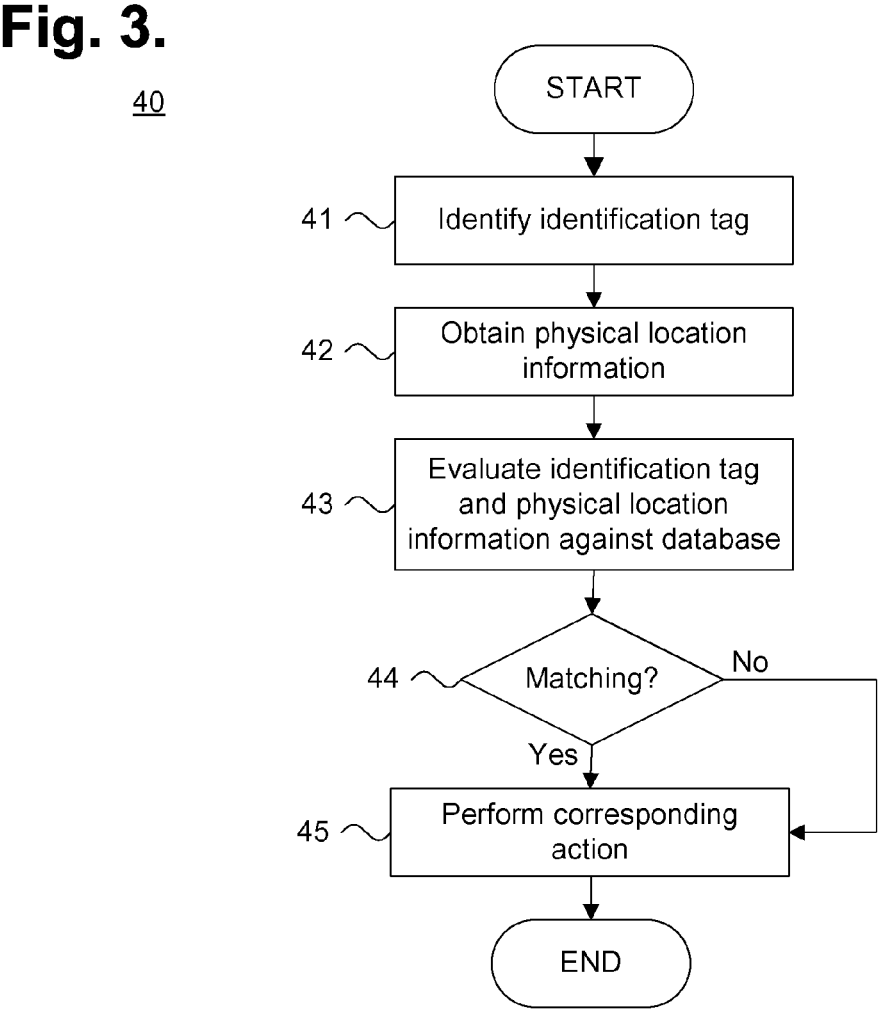
FIG. 2 is a block diagram showing, by way of example, action records as stored in the actions databases of FIG. 1.
FIG. 3 is a process flow diagram showing a method for providing a virtual object based on physical location and tagging in accordance with one embodiment.

The actions database stores associations between pairings of physical locations and identification tags and actions. FIG. 2 is a block diagram showing, by way of example, action records 30 as stored in the actions databases 15, 22 of FIG. 1. The actions database is columnarly-organized into action 31, identification tag 32, and physical location 33 entries. Other columns are possible. Each individual record 34 associates an action entry 31 with a pairing of identification tag 32 and physical location 33 entries.

Each action entry 34 specifies a virtual object that is rendered through the MCP 12 and which contributes to a three-dimensional augmented reality user experience. The virtual objects include displayed text, visualized images or scenes, auditory sounds, tactile feedback, and the like, as supportable through the capabilities of the MCP 12 or in conjunction with an affiliated device or hardware that is functionally coupled to the MCP 12, such as virtual reality display goggles, headphones, and LCD projectors, as well as the server 20. The augmented reality space is considered three-dimensional by virtue of user actions correspondingly occurring in the real world. For instance, the physical act of walking will cause a change in physical location of the MCP 12. A change to the virtual reality rendering therefore occurs by virtue of execution of an action whenever an identification tag 18 on a physical object 19 and the physical location information 14 coincide with an identification tag and physical location entries pairing in the actions database.

The records in each actions database form a scenario that can be part of a virtual reality storyline or theme in which actions occur in a specific sequence and are conditioned upon earlier actions have been performed first, or be provided as discrete sets of actions in an unordered list untied to a particular scenario. The scenario can be performed by a single device, or with multiple devices communicating information about their respective virtual objects over a network. Performance of the virtual objects can also be conditioned on the progress of other network-connected devices that are also executing the scenario. Each identification number can be used one or more times in association with different actions and physical locations. The physical location entries 33 includes geolocational or other locational data representations. The physical location 33 entries can be in a format distinct yet translatable from the format used to express physical location information 14 of the MCP 12.

Each MCP 12 enables a user to use a physical location or position determined using a GPS receiver or similar means to trigger an action when a tag-identified physical object is encountered and recognized. FIG. 3 is a process flow diagram showing a method 40 for providing a virtual object based on physical location and tagging in accordance with one embodiment. The method 40 is executed by the MCP 12 and, where applicable, by affiliated hardware or devices functionally coupled to the MCP 12.

Initially, a user operates the MCP 12 in a machine portable, that is, non-stationary, manner. The user can be in motion, for example, during activities including a treasure hunt game, guided tour, or walk, or may be momentarily still, such as stopped to pick up an object. Other types of activities are possible. The activities can occur on foot or by means of conveyance, for instance, during travel by vehicle, airplane, train, or boat. The user can encounter one or more identification tags 18 or similar data markers during the activity, which are read and identified by the MCP 12 (step 41). In a further embodiment, the identification tag 18 can be manually input by the user through the MCP's user interface. Concurrently, the MCP 12 self-identifies its own location (step 42) using, for instance, GPS signals received from the GPS satellites to obtain geolocational data describing the physical location information 14. In a further embodiment, the physical location information 14 can be manually input by the user through the MCP's user interface. The MCP 12 pairs the transmits the identification tag 18 and the physical location information 14, which are collectively evaluated against the associations of pairings of physical location 33 and identification tag 32 entries in the actions database (step 43). If a matching of the collected and the stored locational and tag information is made (step 44), one or more associated action 31 entries are retrieved and performed (step 45). Additionally, actions associated with predetermined geolocational data and data markers that fall within a particular boundary of the received geolocational data can also be identified. A single action, or a sequence of actions, may be performed. The method 10 is repeated for each identification tag 18 encountered.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for providing a virtual object based on physical location and an identification tag, comprising:
   maintaining a set of virtual objects in a database on a mobile computing device, each virtual object comprising an action corresponding to a triggerable event associated with an identifier and coordinates for one or more physical locations; and
   executing an application program on the mobile computing device operable by a user comprising a downloadable cartridge written as an executable script that defines each triggerable event, comprising:
      continuously tracking a physical location of the mobile computing device in response to movement of the user and continuously reading an identification tag within range of the mobile computing device that is dynamically determined based on a combination of the continuously read identification tag and the continuously tracked physical location of the mobile computing device;
      matching the continuously tracked physical location and the continuously read identification tag respectively to the coordinates and the identifiers for the virtual objects in the database and triggering the action associated with the virtual object whose identifier was matched to the continuously read identification tag and whose coordinates were matched to the continuously tracked physical location of the corresponding triggerable event; and
      presenting a user experience to the user through a user interface of the mobile computing device in response to a combination of the movement performed by the user and the matched virtual object as an output of the mobile computing device.

2. A method according to claim 1, further comprising:
   determining the physical location of the mobile computing device through one or more of a global positioning system receiver, a stationary data marker, and a user input.

3. A method according to claim 1, further comprising:
   providing the identification tag either associated with or attached to a physical object that can be movable or stationary.

4. A method according to claim 1, further comprising one of:
   defining the identification tag passively and comprising at least one of a bar code, a grid, an image tag, and a sequence that is either alphabetic, numeric, symbolic, or combinations thereof; and
   defining the identification tag actively and comprising at least one of a wireless transmitter and a radio frequency identification tag.

5. A method according to claim 1, further comprising:
   defining the coordinates for the physical locations as geolocational information.

6. A method according to claim 1, further comprising:
presenting the user experience through the user interface of the mobile computing device comprising one or more of displayed text, visualized images or scenes, auditory sounds, and tactile feedback.

7. A method according to claim 6, further comprising:
a device affiliated with the mobile computing device presenting at least part of the user experience and comprising at least one of virtual reality goggles, headphones, an LCD projector, and a centralized server.

8. A method according to claim 1, wherein the mobile computing device comprises at least one of a portable media player, a personal data assistant, and a mobile telephone.

9. A computer-implemented method for providing a virtual object through a network based on physical location and an identification tag, comprising:
maintaining a set of virtual objects in a database on a centralized server, each virtual object comprising an action corresponding to a triggerable event associated with an identifier and coordinates for one or more physical locations;
interfacing a mobile computing device with the centralized server over a data communications network; and
providing the virtual objects to the mobile computing device, comprising:
executing an application program on the mobile computing device operable by a user comprising a downloadable cartridge written as an executable script that defines each triggerable event, comprising:
continuously tracking a physical location of the mobile computing device in response to movement of the user and continuously reading an identification tag within range of the mobile computing device that is dynamically determined based on a combination of the continuously read identification tag and the continuously tracked physical location of the mobile computing device;
matching the continuously tracked physical location and the continuously read identification tag respectively to the coordinates and the identifiers for the virtual objects in the database and triggering the action associated with the virtual object whose identifier was matched to the continuously read identification tag and whose coordinates were matched to the continuously tracked physical location of the corresponding triggerable event; and
for each of the coordinates and identifiers matched to the continuously tracked physical location and the continuosly read identification tag, performing the action associated with the correspondingly matched virtual object using presenting a user experience to the user through a user interface of the mobile computing device in response to a combination of the movement performed by the user and the matched virtual object as an output of the mobile computing device.

10. A method according to claim 9, further comprising at least one of:
performing the matching of the mobile computing device's physical location and the identification tag remotely on the centralized server; and
performing the matching of the mobile computing device's physical location and the identification tag locally on the mobile computing device.

11. A method according to claim 9, further comprising:
interfacing the mobile computing device with one or more other mobile computing devices over the data communications network; and
exchanging information regarding the virtual objects with the other mobile computing devices.

12. A method according to claim 9, further comprising:
maintaining a further set of virtual objects in a local database on the mobile computing device; and
performing the matching of the mobile computing device's physical location and the identification tag to at least one of the database on the centralized server and the local database on the mobile computing device.

13. A method according to claim 9, further comprising:
presenting the user experience to the user through the user interface of the mobile computing device comprising one or more of displayed text, visualized images or scenes, auditory sounds, and tactile feedback.

14. A method according to claim 9, wherein the data communications network comprises at least one of an intranetwork, an internetwork, an open network, a proprietary network, a wired network, a wireless network, and a satellite network.

15. A computer-implemented method for performing an augmented reality scenario, comprising:
defining a scenario, comprising:
placing an identification tag at a plurality of physical locations;
specifying at least one action to be performed at each of the physical locations at which one such identification tag has been placed; and
defining virtual objects comprising each of the actions corresponding to a triggerable event associated with an identifier and coordinates for the physical location of the action;
assembling all of the virtual objects into a database; and
performing the scenario through a mobile computing device, comprising:
executing an application program on the mobile computing device operable by a user comprising a downloadable cartridge written as an executable script that defines each triggerable event, comprising:
continuously tracking a physical location of the mobile computing device in response to movement of the user and continuously reading an identification tag within range of the mobile computing device that is dynamically determined based on a combination of the continuously read identification tag and the continuously tracked physical location of the mobile computing device;
matching the continuously tracked physical location and the continuously read identification tag respectively to the coordinates and the identifiers for the virtual objects in the database and triggering the action associated with the virtual object whose identifier was matched to the continuously read identification tag and whose coordinates were matched to the continuously tracked physical location of the corresponding triggerable event; and
presenting a user experience to the user through user interface of the mobile computing device in response to a combination of the movement performed by the user and the matched virtual object as an output of the mobile computing device.

16. A method according to claim 15, further comprising at least one of:
sequencing the virtual objects of the scenario in a specific order, wherein the performance of each action is conditioned on the performance of any of the actions occurring earlier in the scenario; and listing the virtual objects of the scenario as an unordered list, wherein the performance of each action can occur independent of the performance of any of the actions occurring elsewhere in the scenario.

17. A method according to claim 15, further comprising:

maintaining the database on at least one of the mobile computing device and a centralized server interconnected to the mobile computing device over a data communications network; and performing the matching of the mobile computing device's physical location and the identification tag to at least one of the database on the centralized server and the database on the mobile computing device.

18. A method according to claim 15, further comprising:

interfacing the mobile computing device with one or more other mobile computing devices over a data communications network; and exchanging information regarding the virtual objects with the other mobile computing devices.

19. A method according to claim 18, further comprising:

conditioning the performance of the actions in the virtual objects of the scenario on the mobile computing device based on progress through the scenario of the other mobile computing devices.

\* \* \* \* \*